US008784962B2

(12) United States Patent
Weidinger et al.

(10) Patent No.: US 8,784,962 B2
(45) Date of Patent: Jul. 22, 2014

(54) ELASTOMERIC LOW TEMPERATURE INSULATION

(75) Inventors: Jürgen Weidinger, Münster (DE); Steve Weiss, Müster (DE)

(73) Assignee: Armacell Enterprise GmbH (DE)

( * ) Notice: Subject to any disclaimer, the term of this patent is extended or adjusted under 35 U.S.C. 154(b) by 118 days.

(21) Appl. No.: 12/986,560

(22) Filed: Jan. 7, 2011

(65) Prior Publication Data

US 2011/0165407 A1 Jul. 7, 2011

(30) Foreign Application Priority Data

Jan. 7, 2010 (EP) .................................... 10150211

(51) Int. Cl.
*F16L 11/04* (2006.01)
*B32B 1/08* (2006.01)

(52) U.S. Cl.
USPC .................... 428/36.91; 428/36.5; 428/316.6; 428/319.1; 428/314.4; 428/314.8; 138/143; 138/149

(58) Field of Classification Search
USPC ............ 428/314.4, 314.8, 316.6, 319.1, 36.5, 428/36.91; 138/143, 149
See application file for complete search history.

(56) References Cited

U.S. PATENT DOCUMENTS

| 4,044,184 | A |   | 8/1977 | Ashida et al. |
| 4,426,494 | A |   | 1/1984 | Beasley et al. |
| 4,451,586 | A |   | 5/1984 | Searl et al. |
| 4,680,317 | A | * | 7/1987 | Kuhnel et al. .................... 521/89 |
| 5,400,602 | A |   | 3/1995 | Chang et al. |
| 6,716,520 | B2 | * | 4/2004 | Cook, II ...................... 428/314.4 |
| 2007/0254971 | A1 | * | 11/2007 | De Vogel et al. ................ 521/59 |
| 2007/0293592 | A1 | * | 12/2007 | Jacobs et al. .................. 521/50.5 |
| 2008/0087870 | A1 |   | 4/2008 | Williams et al. |
| 2010/0071289 | A1 | * | 3/2010 | Princell et al. ............... 52/309.6 |
| 2010/0200048 | A1 | * | 8/2010 | Taruno et al. .................. 136/251 |

FOREIGN PATENT DOCUMENTS

| CA | 1179463 | 12/1984 |
| CA | 1244336 | 11/1988 |
| CN | 1334193 A | 2/2002 |
| CN | 2937735 | 8/2007 |
| CN | 201060692 | 5/2008 |
| CN | 101221836 | 7/2008 |
| CN | 101357979 | 2/2009 |
| DE | 19954150 | 5/2001 |
| DE | 60114744 | 7/2006 |
| EP | 0551640 | 12/1992 |
| EP | 1878663 | 1/2008 |
| FR | 2876438 | 4/2006 |

(Continued)

OTHER PUBLICATIONS

European Search Report for related application, No. EP 10150211.0, mailed Jun. 26, 2010.

(Continued)

*Primary Examiner* — Hai Vo
(74) *Attorney, Agent, or Firm* — Womble Carlyle Sandridge & Rice LLP; D. Scott Sudderth; Alireza Behrooz

(57) ABSTRACT

The present invention relates to a multilayer insulation based on expandable and crosslinkable elastomeric material with improved low temperature resistance and flexibility, the process for manufacturing of such material and system, and the use of such material and system.

12 Claims, 2 Drawing Sheets

(56) References Cited

FOREIGN PATENT DOCUMENTS

| | | |
|---|---|---|
| GB | 1110579 | 9/1965 |
| GB | 1436109 | 8/1973 |
| GB | 1447532 | 11/1973 |
| GB | 1438226 | 6/1974 |
| GB | 1482222 | 8/1974 |
| GB | 2362697 | 11/2001 |
| JP | 5208438 | 8/1993 |
| WO | WO 97/33935 | 9/1997 |
| WO | WO 01/30914 | 5/2001 |
| WO | WO 03/002303 | 9/2003 |
| WO | WO 03/095538 | 11/2003 |
| WO | WO 2008/031545 | 3/2008 |
| WO | WO 2009037962 A1 * | 3/2009 |

OTHER PUBLICATIONS

Notice from EPO for related application No. WO 97/33935, undated.

* cited by examiner

ELASTOMERIC LOW TEMPERATURE INSULATION

CROSS-REFERENCE TO RELATED APPLICATION

This application claims priority to prior European Patent Application No. 10 150 211.0, filed Jan. 7, 2010, entitled "Elastomeric Low Temperature Insulation."

INCORPORATION BY REFERENCE

The entire disclosure of European Patent Application No. 10 150 211.0, filed Jan. 7, 2010 is incorporated herein by reference as if set forth in its entirety.

FIELD OF THE INVENTION

The present invention relates to a multilayer insulation based on expandable and crosslinkable elastomeric material with improved low temperature resistance and flexibility, a process for manufacturing of such material and system, and the use of such material and system.

BACKGROUND OF THE INVENTION

Insulation is an essential part of industrial building and construction, especially in the chemical and petrochemical industry where physical and chemical reactions take place at very high temperatures and where transport and storage require extremely low temperatures, e.g. ranging from −40° C. for ammonia over −100° C. for ethylene down to −165° C. for liquefied natural gas or even down to −200° C. and less for liquefied air components. Down from −80° C. the industry usually is speaking of "cryogenic conditions". The insulation of pipework, tanks etc. bearing such cryogenic conditions is extremely challenging due to the fact that all materials will get frozen in a certain manner, condensation of humidity from the air to ice is a real problem, and even materials being soft at 0° C. will become abrasive to the installation when talking about cryogenic temperatures. Sole material or single layers can not provide safe and sufficient insulation of cryogenic temperatures, therefore whole insulation systems are used, consisting of multiple layers of insulation material in its composites mostly covered by a cladding (as basically described in some documents filed by chemical companies, such as Linde: DE 19954150, Mitsubishi: GB 1438226, Exxon: GB 1110579, and Dow: GB 1447532).

In the past, mainly inorganic materials had been used for cryogenic insulation, namely mineral wool, glass fibre and foamed glass, or sometimes aerogels (e.g. U.S. 20080087870). The fibrous materials lack of resistance to water vapour transmission (WVT) and have to be installed in rather complex systems by taking absolute care to seal the installation completely, because else condensation of humidity to ice would occur through the insulation, leading to the notorious under insulation corrosion or to the insulation being first diminished and then destroyed by permanent ice layer growth. Foamed glass or aerogel insulation is also critical concerning the WVT, and additionally is very brittle and known for complicated mounting (in the case of aerogels also some health risks are discussed) and inevitable scrap.

It is often claimed as a major of advantage of inorganic systems that they are fire safe; this, however, is only true for the pure insulation material itself, because seals, seam protection, application of adhesives for joints, lamination etc. is essential for the application of these materials, and the products used for providing that are organic and therefore combustible. This is also true for a second class of cryogenic insulations being organic and based on polycondensate polymer foam, mainly polyurethane (PUR) or polyisocyanurate (PIR). These materials show acceptably low thermal conductivity (however, attention has to be paid to the fact that often thermal conductivity values are provided with the foaming gas still being present in the cells and not yet being replaced by air that would render the insulation performance worse), as well as acceptable WVT. Their brittleness is lower than for foamed glass and it is available in more shapes that even can be adapted on site within a small range. Polyolefin insulations (see e.g. EP 0891390, or JP 5208438, where an elastomeric foam hose protects an inner polyolefin layer) as an alternative to PUR/PIR are rare in the cryogenic field and show almost the same deficiencies.

Some work has been done on the improvement of thermoplastic materials and on the insulation systems using them, such as disclosed in DE 19954150GB 1438226, GB 1110579, GB 1447532, or EP 1878663, CN 2937735 and CN 101357979 (mentions LNG insulation), all based on PUR/PIR. GB 1436109 discloses an insulation material for cryogenic containers based on modified polyurethane; FR 2876438 describes the possible use of (expensive) polyether imide foam and GB 2362697 as well as U.S. Pat. No. 5,400,602 mention a complex and likely expensive PTFE based system for cryogenic fluid transfer; CA 1179463 claims improved rigid insulation sheet for cryogenic purposes obtained by compression of thermoplastic foam; CA 1244336 describes an improved multilayer system based on styrenic foam, whereas CN 1334193 claims a multilayer system based on PUR, foamed glass or expanded perlite, whereas U.S. Pat. No. 4,044,184 describes an insulation board coated with a plurality of rigid foam layers. All these systems require at least one, mostly several vapour barriers, and are very sensitive to mechanical impact, such as somebody stepping on an insulated part, or vibration.

Some examinations also have been carried out on thermoplastic elastomers (TPEs) or similar copolymers, such as in CN 101392063 (polysiloxane/polyamide) and WO 2001030914 (polyester/polyether/polyamide) or GB 1482222 (foamed polyethylene copolymer). However, at very low temperatures it is known that the TPEs' thermoplastic blocks will act as a crystallization initiator and overcompensate the properties of the elastomeric blocks, apart from the fact that all polymers bases used are not blocking vapour migration and thus will lead to a bad WVT performance, and their sensitivity to mechanic shock. CN 201060692 and CN 101221836 mention a (massive) elastomeric insulation layer for wind energy cables being exposed to low temperatures (−40° C. and lower), DE 19954150 mentions an elastomer as part of a cryogenic insulation system, however, as a massive and outer layer, too. DE 60114744 describes adhesives also for low temperatures based on ethylene-propylene terpolymers. Terpolymers in fact being of interest for low temperature applications are ethylene-propylene-diene polymers as base for elastomers (EPDM). EPDM has been mentioned in some cases to be able to withstand some low temperature impact: WO 2003002303 claims a nozzle made from massive EPDM (however, a very hard one) for treating surfaces with cryogenic particles; U.S. Pat. No. 4,426,494 describes an unsaturated ethylene polymer (a class where also EPDM can be found) and mentions improved properties for cryogenic area among others. However, detailed and extensive investigations about the cryogenic insulation properties of rubbers in general, especially expanded co- or terpolymeric rubber, such as EPDM foam, do not appear to have been done so far.

SUMMARY OF THE INVENTION

A major object of the present invention thus is to provide an insulation material with resistance to a maximum possible range of cryogenic temperatures that will remain flexible enough to absorb mechanical load and which is absorbing vibrations and does provide intrinsic vapour barriers properties, a process for manufacturing the same and its composites to obtain multilayer systems.

As a result of the presently named inventor's research on rubber foams for other insulation applications, e.g. for climate control and cooling/chilling systems ranging from 0° C. to −50° C., we surprisingly found that such material not showing the above mentioned disadvantages can be achieved by using expanded material of specially modified diene terpolymer based elastomer compounds as first inner insulation layer, followed by additional cellular layers to form a multilayer system.

Various additional objects, features and advantages of the present invention will become apparent to those skilled in the art upon a reading of the following Detailed Description, when taken in conjunction with the accompanying drawings.

DETAILED DESCRIPTION OF THE INVENTION

Figure 1B:
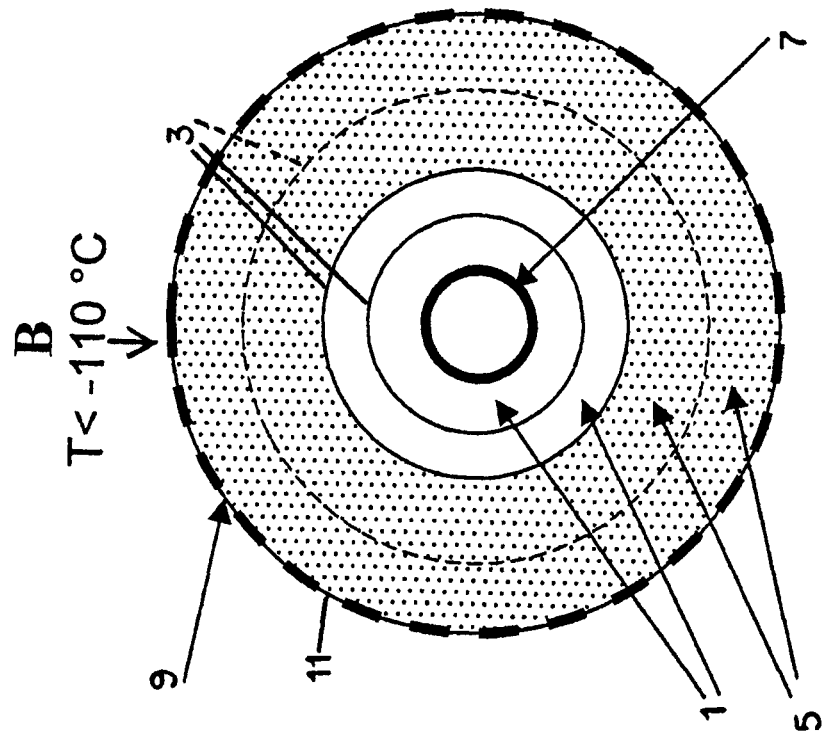
FIGS. 1A-1B are side views of example embodiments of an elastomeric low temperature insulation material according to the principles of the present invention.
Figure 1A:
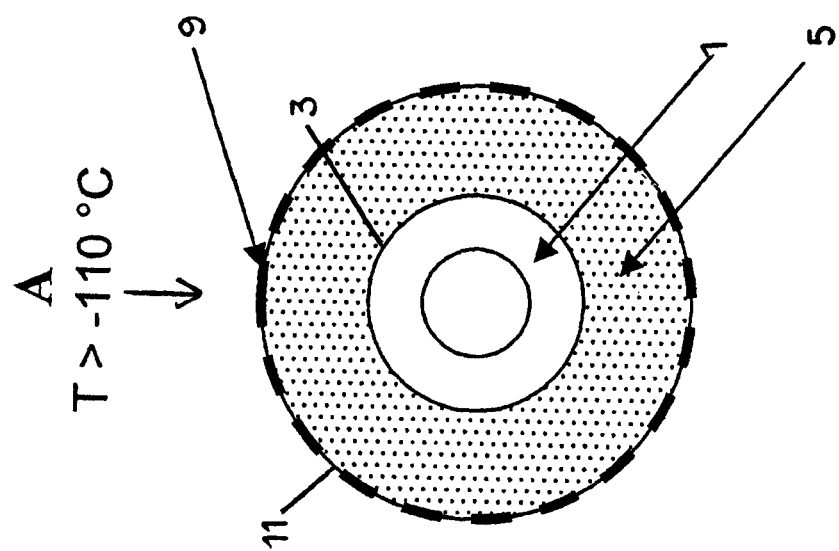
Figure 2:
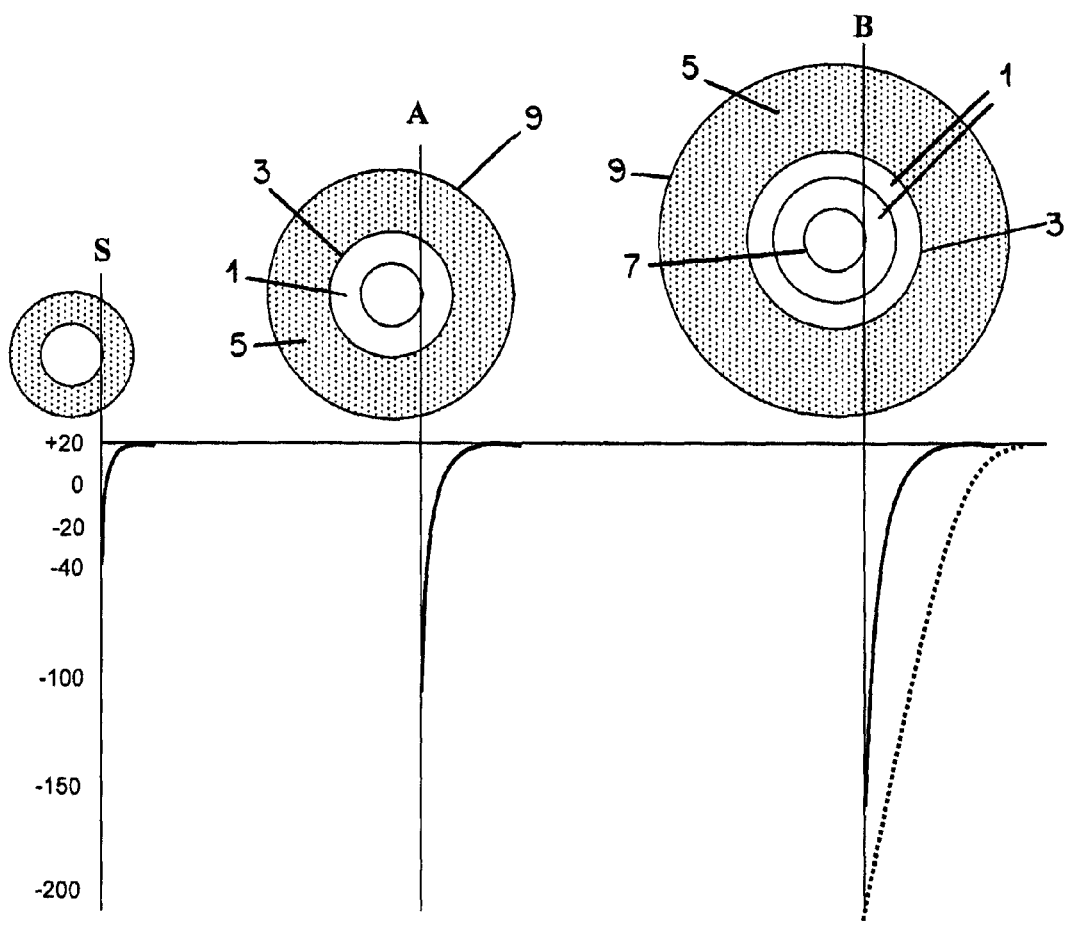
FIG. 2 illustrates a comparison of the thermal conductivity of the example embodiments of the elastomeric low temperature insulation materials of FIGS. 1A-1B compared to a standard insulation material.

The elastomeric low temperature insulation material indicated at A in FIGS. 1A and 2 and at B in FIGS. 1B and 2, generally comprises a multi-layer insulation based on expandable and crosslinkable elastomeric materials with improved low temperature resistance and flexibility. The composite low temperature insulation material contains a first expandable and cross-linkable elastomer or copolymer compound indicated at 1 in FIGS. 1A-1B, which includes at least one expanded poly-(ethylene-propylene-diene) based elastomer sheet, profile or tube. Preferred for the making of such parts are poly(ethylene-propylene-diene) (EPDM) based elastomers, especially preferred such being produced in a continuous process by extrusion, where crosslinking and expansion takes place in parallel or within short time difference. The foaming can be achieved by physical foaming agents: either by evaporation of liquids such as, but not exclusively, water, fluorocarbons, solvents (e.g. isobutane, cyclopentane, cyclopentadiene etc.), and mixtures thereof, or with gases such as, but not exclusively, $CO_2$, nitrogen etc., and mixtures thereof; or by chemical foaming agents, such as, but not exclusively, azo-compounds, carbonates etc., and mixtures thereof; or by mixtures of chemical and physical foaming agents in any ratio and composition. Preferred is an expansion by chemical foaming agents, and in one embodiment, especially preferred is azodicarbonamide as a chemical foaming agent, as it shows a high gas formation potential, creates inert gas ($N_2$) when decomposing, and will decompose at a temperature range being convenient for harmonizing the expansion and the crosslinking.

The crosslinking may be initiated by radiation, peroxides, or sulphur compounds. Preferred is a crosslinking by sulphur compounds, especially preferred is a crosslinking by combination of sulphur and dithiocarbamates and/or thio-ureates together with zinc oxide for best balancing the crosslinking with the expansion. Sulphur based crosslinking is also preferred due to the fact that the created irregular $S_x$ bridging between the polymers will render the material more amorphous and lead to better properties at low temperature. The first copolymer compound 1 also may contain other ingredients, such as, but not exclusively: fillers, other polymers (thermoplasts, thermosets, TPEs, elastomers), fibres, additives, colours, crosslinkers, ceramifying or char-forming agents, intumescent systems, stabilizers, anti-hydrolysis agents, flame retardant agents etc.

The final insulation system A (FIG. 1A) or B (FIG. 1B) may require more than one layer of the first copolymer component 1, see FIG. 1B, with the individual layers having the same or different properties, such as mechanical strength, density, open cell content etc. The layers can be put on each other loosely or be adhered by using adhesives 3 therebetween. The first copolymer compound 1 generally needs to have a high content of closed cells to provide good insulation and vapour barrier properties. The preferred closed cell content is more than about 95%. To provide optimum insulation and low weight the density of the final board should be in a range of 10 to 100 kg/m³, preferably 20 to 80 kg/m³, especially preferred are 30 to 70 kg/m³ to achieve a well balanced property profile for both thermal and sound/vibration insulation. A preferred thermal conductivity for the first copolymer compound 1 is below 0.08 $W^{-1}m^{-1}K^{-1}$, especially preferred is a thermal conductivity lower than 0.04 $Wm^{-1}K^{-1}$. Depending on the temperatures to be insulated higher thicknesses or more layers at given thickness of first copolymer compound 1 may be necessary (see FIG. 2, embodiment A: −100° C./ethylene pipe situation; in comparison with embodiment B: −165° C./LNG pipe situation).

The total thickness/number of layers of the first copolymer compound 1 is dependent on the point where a non-critical temperature is achieved on the outer surface of the first copolymer compound 1. FIG. 2 illustrates a comparison of thermal conductivity at deceasing temperatures of the disclosed embodiments A and B of the present elastomeric low temperature insulation and a standard (S) pipe insulation construction. At −40° C. cold pipe standard elastomers partially can do the job (FIG. 2 at S). At −100° C. cold pipes one layer of compound 1 of around 30 mm thickness will lead to a surface temperature of approximately −50° C. where standard insulation foam, e.g. the insulation of embodiment A, will work again (FIG. 2 at A). At −165° C. a double layer of 30 mm of compound 1 would be necessary to achieve the same (FIG. 2 at B). At −200° C. (dotted line in FIG. 2—embodiment B) additional thickness of the first copolymer of compound 1 would be required etc.

The claimed material may contain at least one additional insulation layer or second compound 5 (FIGS. 1A-1B) consisting of another cellular or expanded elastomeric insulation material, such as inorganic insulation (fiberglass, foamglass, mineral wool), rigid organic insulation (PUR/PIR, polystyrene etc.) or flexible organic insulation (see FIG. 1). Preferred are expanded flexible materials, especially preferred are rubber foams such as from, but not exclusively, NR/IR, IIR, BR, NBR, CR, SBR BR, ACM/AEM, FPM/FKM, EPM/EPDM, ECO, Q etc. Apart from the rubber polymers, the second compound 5 may contain other ingredients, such as, but not exclusively: fillers, other polymers (thermoplasts, thermosets, TPEs, elastomers), fibres, additives, colours, crosslinkers, ceramifying or char-forming agents, intumescent systems, stabilizers, anti-hydrolysis agents, flame retardant agents etc. The final insulation system may require more than one layer of the second compound 5, see FIG. 1B, with the individual layers having same or different properties, such as mechanical strength, density, open cell content etc. The layer of the second compound 5 can be connected with the layer of the first copolymer compound 1 through adhesion by aid of adhesive layer 3 or being put on the first copolymer layer too loosely. A preferred closed cell content of the second compound 5 is more than 95%, preferred density is 40 to 200 kg/m$^3$, and the preferred thermal conductivity of the insulation of embodiment B is lower than 0.04 Wm$^{-1}$K$^{-1}$. The total thickness/number of layers of the second compound 5 on the layer(s) of the first copolymer compound 1 is dependent on the point where ambient temperature is achieved on the outer surface of the second compound 5, see FIG. 2.

The elastomeric insulation material furthermore may contain at least one additional functional layer 7 which is applied on the inner surface of compound 1 when the final application is running at temperatures being permanently below −110° C. (see FIG. 1B). Layer 7 may consist of any material that does not become brittle and abrasive at the given temperatures. Preferred are metal foils, and especially preferred is aluminium foil as it is easy to adhere, low temperature stable, not abrasive and not corrosive. The layer of the second compound 5 is connected with the first copolymer compound 1 by adhesion by aid of elastomeric insulation. The functional layer 7 will enlarge the elastomeric insulation's temperature performance range by an effect below −110° C., the shrinkage by temperature of the first copolymer compound 1 will reach a level where the foil can no more follow and thus will create ripples. These ripples will form first an additional insulation layer by creating hollow space and second lead to a significant decoupling of the composite and especially of the first copolymer compound 1 from the cold object.

The elastomeric insulation material A/B further may contain an outer layer 9 for protection against the environment (see FIGS. 1A-1B). This can be a coating with high strength material, e.g. fibre reinforced plastics, that is adhered to the first copolymer compound 1 by adhesive layer 3; or a cladding by high strength material, e.g. metal, that can be adhered or loosely mounted.

The composite elastomeric insulation material may contain adhesive layer 3 to bond the layers of the first copolymer and second compounds 1 and 5, and if necessary, functional layer 7 (FIG. 1B) of the composite insulation material together. Adhesive layer(s) 3 can be chosen from mineral or organic based adhesives, preferred are flame retardant organic adhesives, e.g. based on chloroprene, acrylics, vinyl acetate etc.

The composite elastomeric insulation material furthermore may contain additional, secondary functional layers 11, consisting of e.g. mineral based substances, metal, fibres, paper or plastics, in all forms (e.g. layer, sheet, foil, mesh, fabric, weave, nonwoven etc.) as covering on the composite insulation materials A and/or B to act e.g. as a protective, shielding, or as reinforcing layer. These additional functional layers 11 may be bonded to the first copolymer compound 1 or the second compound 5 by adhesives such as 3, or adhered by themselves such as by pressure or other means.

The composite elastomeric insulation material furthermore may contain any further element or component layer necessary for the intended application, such as, but not exclusively, parts made from wood, glass, metal or concrete etc., joints, cable or wire, hose etc.

A very prominent advantage of the composite elastomeric insulation material is that it is hydrophobic and will not support vapour diffusion due to its low polarity which leads to the advantages that the claimed material is water repellent and does not require additional vapour barriers to achieve good WVT blocking properties.

Another important advantage of the composite elastomeric insulation material is its low temperature flexibility provided by its amorphous character.

This leads to another advantage of the composite elastomeric insulation material which is that it will not get brittle when being applied.

This leads to another important advantage of the composite elastomeric insulation material which is that it will be able to absorb shock energy, i.e., be able to absorb mechanical impact and/or vibration harshness.

The improved low temperature properties of the material lead to still another advantage of the composite elastomeric insulation material, which is its easy handling and mounting properties even on cold line pipes, which will save time and significantly will bring down mounting and maintenance costs as shutdown of such cold line pipes is no more necessary.

Another advantage of the composite elastomeric insulation material is that manufacturing of prefabricated parts even for very complex geometries to be insulated (e.g. valves, T-shaped parts etc.), either by the material supplier or even on job site is very easy as the claimed material is flexible and easy to bend and shape.

Another advantage of the composite elastomeric insulation material is its low abrasiveness which allows direct mounting on metal installations.

This leads to another advantage of the composite elastomeric insulation material which is that it is chemically neutral and not corrosive.

Another advantage of the composite elastomeric insulation material is that it is chemically resistant and resistant to weathering.

Another important advantage of the composite elastomeric insulation material is that the inner layer consisting of terpolymers is not only low temperature resistant, but also is heat resistant to more than 150° C., which is important as most cryogenic installations are cleaned by e.g. pressurized vapour or hot fluids.

A basic advantage of the composite elastomeric insulation material is that it is free of fibres, isocyanates and PVC, all of them being under survey and being discussed for environmental and health issues.

It is a further advantage of the composite elastomeric insulation material that it can be produced in an economic way in a continuous process.

It is a further advantage of the composite elastomeric insulation material that it can be manufactured and given shape by standard methods being known in the industry and that it does not require specialized equipment.

A further advantage of the composite elastomeric insulation material is its excellent suitability for both thermal and sound/vibration insulation and the fact that its insulation properties are provided over a wide range of temperature from −200/−110 to +170° C.

Those skilled in the art will appreciate that many modifications to the exemplary embodiments are possible without departing from the scope of the invention. In addition, it is possible to use some of the features of the embodiments described without the corresponding use of the other features. Accordingly, the foregoing description of the exemplary embodiments is provided for the purpose of illustrating the principle of the invention, and not in limitation thereof, since the scope of the invention is defined solely by the appended claims.

We claim:

1. A system comprising a pipe or a tank and an elastomeric low temperature insulation material for insulating the pipe or the tank, the elastomeric low temperature insulation material comprising
   (a) at least one expanded elastomeric insulation foam layer made from an expandable and crosslinkable copolymer, wherein the foam layer has a first and a second opposed surface, wherein the copolymer comprises polyethylene and polypropylene units;
   (b) at least one additional insulation layer applied to the first surface of the foam layer; and
   (c) a protective layer comprising a metal foil, wherein the protective layer is applied on the second surface of the foam layer such that the protective layer is disposed between the foam layer and the pipe or the tank, and wherein the foam layer comprises ripples, thereby creating a hollow space and a decoupling of the elastomeric low temperature insulation material from the pipe or the tank.

2. The system according to claim 1 wherein the copolymer comprises a poly(ethylene-propylene-diene).

3. The system according to claim 1 wherein the copolymer has a closed cell content greater than 95%.

4. The system according to claim 1 wherein the foam layer has a density of 10 to 100 kg/m$^3$.

5. The system according to claim 1 wherein the copolymer has a thermal conductivity below 0.08 Wm$^{-1}$K$^{-1}$.

6. The system according to claim 1, wherein the at least one additional insulation layer comprises an expanded polymer.

7. The system according to claim 1, wherein the at least one additional insulation layer comprises an expanded elastomer with a closed cell content more than 95%, a density of 40 to 200 kg/m$^3$, and a thermal conductivity lower than 0.04 Wm$^{-1}$K$^{-1}$.

8. The system according to claim 1 wherein the metal foil is an aluminium foil.

9. The system according to claim 8 where the aluminium foil is adhered to the second surface of the foam layer.

10. A system according to claim 9, wherein the elastomeric low temperature insulation material is manufactured by a process comprising a lamination process.

11. A system according to claim 1, wherein the elastomeric low temperature insulation material is manufactured by a process comprising a continuous extrusion process.

12. The system according to claim 1, wherein the elastomeric low temperature insulation material is applied for thermal and/or acoustic insulation and/or acoustic and/or vibration damping.

\* \* \* \* \*